United States Patent Office 3,694,374
Patented Sept. 26, 1972

3,694,374
ANTIOXIDANT MIXTURE OF AN AMINEBORATE AND A KETONEPHENOL OR ALDEHYDEPHENOL
Allen K. Sparks, 30 Algonquin Road, Des Plaines, Ill. 60016, and James J. Louvar, 534 Hinman, Evanston, Ill. 60202
No Drawing. Filed May 11, 1970, Ser. No. 36,494
Int. Cl. B01j 1/16
U.S. Cl. 252—400
15 Claims

ABSTRACT OF THE DISCLOSURE

Synergistic mixture of (1) borate of N,N-dihydrocarbyl-alkanolamine or borate of polyalkyl- or polycycloalkylpolyhydroxyalkyl-alkylenepolyamine and (2) reaction product of a phenol and ketone or aldehyde. In one embodiment the mixture is particularly useful in the stabilization of plastics and resins.

BACKGROUND OF THE INVENTION

Numerous additives have been proposed heretofore for stabilizing plastics and resins against deterioration due to oxidation, thermal effects, ultraviolet light, etc. The search still goes on to find more effective additives, either singly but more likely as mixtures. Among the better additives are the borates of certain alkanolamines. However, as mentioned above, there still is a desire to find even more effective additive compositions.

DESCRIPTION OF THE INVENTION

In a search for more effective additives, the present applicants have directed part of their activities to a study of borates of alkanolamines, with the objective of discovering mixtures which produce a synergistic effect. Surprisingly, it has been found that a synergistic effect is obtained when a borate of the alkanolamine and the reaction product of a phenol and ketone are used in admixture. The synergistic effect is surprising because each of these components has been heretofore proposed for such use and normally it would not be expected that further improvements would be obtained by using a mixture of the components as compared to the results obtained when using each component individually.

As hereinbefore set forth, one component of the mixture is a borate of an alkanolamine. The borate may be illustrated as a borate of an alkanolamine of the following formula:

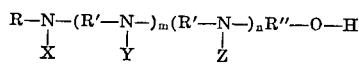

where R is hydrocarbyl, R' is alkylene, R'' is alkylene, X is hydrocarbyl when $m$ and $n$ are zero or hydroxyalkyl when $m$ is one or more and/or $n$ is one, Y is hydrocarbyl when $m$ is one and $n$ is zero or hydroxyalkyl when $m$ is more than one and $n$ is one, Z is hydrocarbyl, $m$ is an integer of zero to four and $n$ is zero or one.

Where $m$ and $n$ are zero and X is hydrocarbyl, this component of the mixture is a borate of an N,N-dihydrocarbylalkanolamine. In one embodiment the hydrocarbyl is alkyl and preferably sec.-alkyl containing from 3 to about 20 carbon atoms although, when desired, each alkyl group may contain up to 50 carbon atoms. Illustrative preferred alkanolamines in this embodiment include N,N-di-isopropyl-ethanolamine,
N,N-di-sec.butyl-ethanolamine,
N,N-di-sec.-pentyl-ethanolamine,
N,N-di-sec.-hexyl-ethanolamine,
N,N-di-sec.-heptyl-ethanolamine,
N,N-di-sec.-octyl-ethanolamine,
N,N-di-sec.-nonyl-ethanolamine,
N,N-di-sec.-decyl-ethanolamine,
N,N-di-sec.-undecyl-ethanolamine,
N,N-di-sec.-dodecyl-ethanolamine,
N,N-di-sec.-tridecyl-ethanolamine,
N,N-di-sec.-tetradecyl-ethanolamine,
N,N-di-sec.-pentadecyl-ethanolamine,
N,N-di-sec.-hexadecyl-ethanolamine,
N,N-di-sec.-heptadecyl-ethanolamine,
N,N-di-sec.-octadecyl-ethanolamine,
N,N-di-sec.-nonadecyl-ethanolamine,
N,N-di-sec.-eicosyl-ethanolamine, and corresponding compounds in which the ethanolamine moiety is replaced by propanolamine or butanolamine or, when desired, by pentanolamine, hexanolamine, heptanolamine, octanolamine, etc. In general, it is preferred that the alkyl groups are the same. However, when desired, the alkyl groups may be different but both of them preferably are of secondary configuration.

In another and preferred emobidment, the borate of the N,N-di-hydrocarbyl-alkanolamine is a borate of N,N-dicycloalkyl-alkanolamine. A particularly preferred alkanolamine in this embodiment is N,N-decyclohexyl-ethanolamine. Other compounds include N,N-dicyclopropyl-ethanolamine,
N,N-dicyclobutyl-ethanolamine,
N,N-dicyclopentyl-ethanolamine,
N,N-dicycloheptyl-ethanolamine,
N,N-dicyclooctyl-ethanolamine,
N,N-dicyclononyl-ethanolamine,
N,N-dicyclodecyl-ethanolamine,
N,N-dicycloundecyl-ethanolamine,
N,N-dicyclododecyl-ethanolamine, etc., and similarly substituted compounds in which the ethanolamine moiety is replaced by an alkanolamine group containing from 3 to about 8 carbon atoms.

In another embodiment the N,N-dihydrocarbyl-alkanolamine may contain one sec.-alkyl group and one cycloalkyl group as, for example, in compounds as N-isopropyl-N-cyclohexyl-ethanolamine,
N-sec.-butyl-N-cyclohexyl-ethanolamine,
N-sec.-pentyl-N-cyclohexyl-ethanolamine,
N-sec.-hexyl-N-cyclohexyl-ethanolamine,
N-sec.-heptyl-N-cyclohexyl-ethanolamine,
N-sec.-octyl-N-cyclohexyl-ethanolamine, etc., and corresponding compounds in which the ethanolamine moiety is replaced by an alkanolamine moiety of from 3 to about 8 carbon atoms.

When $n$ and/or $m$ in the above formula are one or more, this component of the mixture is a borate of a particular polyalkyl- or polycycloalkyl-polyhydroxyalkylalkylenepolyamine which also may be named as an alkanolamine. In this embodiment X is hydroxyalkyl and Y is hydrocarbyl when $m$ is zero or hydroxyalkyl when $n$ is one, and Z is hydrocarbyl.

Referring to the above formula, where $m$ is zero and $n$ is one, the compound is an N,N'-dialkyl-N-hydroxyalkyl-aminoalkyl-alkanolamine, which also may be named N,N'-dialkyl - N,N' - dihydroxyalkyl-ethylenediamine. The alkyl groups preferably are secondary alkyl groups and contain from 3 to about 50 carbon atoms each and more particularly from 4 to 20 carbon atoms each. Illustrative preferred compounds in this embodiment include N,N'-di-sec.-butyl-N-hydroxyethyl-aminoethyl-ethanolamine,
N,N'-di-sec.-pentyl-N-hydroxyethyl-aminoethyl-ethanolamine,
N,N'-di-sec.-hexyl-N-hydroxyethyl-aminoethyl-ethanolamine,
N,N'-di-sec.-heptyl-N-hydroxyethyl-aminoethyl-ethanolamine,
N,N'-di-sec.-octyl-N-hydroxyethyl-aminoethyl-ethanolamine,
N,N'-di-sec.-nonyl-N-hydroxyethyl-aminoethyl-ethanolamine,
N,N'-di-sec.-decyl-N-hydroxyethyl-aminoethyl-ethanolamine,
N,N'-di-sec.-undecyl-N-hydroxyethyl-aminoethyl-ethanolamine,
N,N'-di-sec.-dodecyl-N-hydroxyethyl-aminoethyl ethanolamine,
N,N'-di-sec.-tridecyl-N-hydroxyethyl-aminoethyl-ethanolamine,
N,N'-di-sec.-tetradecyl-N-hydroxyethyl-aminoethyl-ethanolamine,
N,N'-di-sec.-pentadecyl-N-hydroxyethyl-aminoethyl-ethanolamine,
N,N'-di-sec.-hexadecyl-N-hydroxyethyl-aminoethyl-ethanolamine,
N,N'-di-sec.-heptadecyl-N-hydroxyethyl-aminoethyl-ethanolamine,
N,N'-di-sec.-octadecyl-N-hydroxyethyl-aminoethyl-ethanolamine,
N,N'-di-sec.-nonadecyl-N-hydroxyethyl-aminoethyl-ethanolamine,
N,N'-di-sec.-eicosyl-N-hydroxyethyl-aminoethyl-ethanolamine, etc.

The above compounds are illustrative of compounds in which R' and R" each contain two carbon atoms. It is understood that corresponding compounds are included in which one or both of the groups containing two carbon atoms are replaced by a group containing 3, 4, 5 or 6 carbon atoms.

Referring again to the above formula, where $m$ and $n$ are one, the compounds for use in preparing the borate may be named N,N-bis-[N-alkyl-N-(hydroxyalkyl)-aminoalkyl]-alkanolamine and also can be named $N^1,N^3$-dialkyl-$N^1,N^2,N^3$-tri(hydroxyalkyl)-diethylenetriamine. It will be noted that each terminal nitrogen contains an alkyl group and that each nitrogen atom contains a hydroxyalkyl group attached thereto. Illustrative preferred compounds in this embodiment include N,N-bis-[N-sec.-butyl-N-(2-hydroxyethyl)-aminoethyl]-ethanolamine,
N,N-bis-[N-sec.-pentyl-N-(2-hydroxyethyl)-aminoethyl]-ethanolamine,
N,N-bis-[N-sec.-hexyl-N-(2-hydroxyethyl)aminoethyl]-ethanolamine,
N,N-bis-[N-sec.-heptyl-N-(2-hydroxyethyl)-aminoethyl]-ethanolamine,
N,N-bis-[N-sec.-octyl-N-(2-hydroxyethyl)-aminoethyl]-ethanolamine,
N,N-bis-[N-sec.-nonyl-N-(2-hydroxyethyl)-aminoethyl]-ethanolamine,
N,N-bis-[N-sec.-decyl-N-(2-hydroxyethyl)-aminoethyl]-ethanolamine and comprising compounds in which the sec.-alkyl group contains from 11 to about 20 carbon atoms and/or in which one or both of the groups containing two carbon atoms being replaced by a group containing 3, 4, 5, or 6 carbon atoms.

Where $m$ is two and $n$ is one, the compound is an $N^1,N^4$-dialkyl - $N^1,N^2,N^3,N^4$ - tetrahydroxyalkyl-alkylenepolyamine. Illustrative compounds in this embodiment include $N^1,N^4$-di-sec.-butyl-$N^1,N^2,N^3,N^4$-tetra-(2-hydroxyethyl)-triethylenetetramine,
$N^1,N^4$-di-sec.-pentyl-$N^1,N^2,N^3,N^4$-tetra(2-hydroxyethyl)-triethylenetetramine,
$N^1,N^4$-di-sec.-hexyl-$N^1,N^2,N^3,N^4$-tetra-(2-hydroxyethyl)-triethylenetetramine,
$N^1,N^4$-di-sec.-heptyl-$N^1,N^2,N^3,N^4$-tetra-(2-hydroxyethyl)-triethylenetetramine,
$N^1,N^4$-di-sec.-octyl-$N^1,N^2,N^3,N^4$-tetra(2-hydroxyethyl)-triethylenetetramine,
$N^1,N^4$-di-sec.-nonyl-$N^1,N^2,N^3,N^4$-tetra-(2-hydroxyethyl)-triethylenetetramine,
$N^1,N^4$-di-sec.-decyl-$N^1,N^2,N^3,N^4$-tetra-(2-hydroxyethyl)-triethylenetetramine and corresponding compounds in which the sec.-alkyl group contains from 11 to about 20 carbon atoms and/or one or both of the groups containing two carbon atoms being replaced by a group containing 3, 4, 5 or 6 carbon atoms.

Referring again to the above formula, where $m$ is 3 and $n$ is 1, the compound will be an $N^1,N^2,N^3,N^4,N^5$-penta-(hydroxyalkyl)-alkylenepolyamine. Illustrative preferred compounds in this embodiment include $N^1,N^5$-di-sec.-butyl-$N^1,N^2,N^3,N^4,N^5$-penta-(2-hydroxyethyl)-tetraethylenepentamine,
$N^1,N^5$-di-sec.-pentyl-$N^1,N^2,N^3,N^4,N^5$-penta-(2-hydroxyethyl)-tetraethylenepentamine,
$N^1,N^5$-di-sec.-hexyl-$N^1,N^2,N^3,N^4,N^5$-penta-(2-hydroxyethyl)-tetraethylenepentamine,
$N^1,N^5$-di-sec.-heptyl-$N^1,N^2,N^3,N^4,N^5$-penta-(2-hydroxyethyl)-tetraethylenepentamine,
$N^1,N^5$-di-sec.-octyl-$N^1,N^2,N^3,N^4,N^5$-penta-(2-hydroxyethyl)-tetraethylenepentamine,
$N^1,N^5$-di-sec.-nonyl-$N^1,N^2,N^3,N^4,N^5$-penta-(2-hydroxyethyl)-tetraethylenepentamine,
$N^1,N^5$-di-sec.-decyl-$N^1,N^2,N^3,N^4,N^5$-penta-(2-hydroxyethyl)-tetraethylenepentamine and corresponding compounds in which the sec.-alkyl group contains from 11 to about 20 carbon atoms and/or one or both of the groups containing two carbon atoms being replaced by a group containing 3, 4, 5 or 6 carbon atoms.

Referring again to the above formula, where $m$ is 4 and is 1, the compound will be $N^1,N^6$-dialkyl-$N^1,N^2,N^3,N^4,N^5,N^6$-hexa-(hydroxyalkyl)-pentaethylenehexamine. Illustrative preferred compounds in this embodiment include $N^1,N^6$-di-sec.-butyl-$N^1,N^2,N^3,N^4,N^5,N^6$-hexa-(2-hydroxyethyl)-pentaethylene-hexamine,
$N^1,N^6$-di-sec.-pentyl-$N^1,N^2,N^3,N^4,N^5,N^6$-hexa-(2-hydroxyethyl)-pentaethylenehexamine,
$N^1,N^6$-di-sec.-hexyl-$N^1,N^2,N^3,N^4,N^5,N^6$-hexa-(2-hydroxyethyl)-pentaethylenehexamine,
$N^1,N^6$-di-sec.-heptyl-$N^1,N^2,N^3,N^4,N^5,N^6$-hexa-(2-hydroxyethyl)-pentaethylenehexamine,
$N^1,N^6$-di-sec.-octyl-$N^1,N^2,N^3,N^4,N^5,N^6$-hexa-(2-hydroxyethyl)-pentaethylenehexamine,
$N^1,N^6$-di-sec.-nonyl$N^1,N^2,N^3,N^4,N^5,N^6$-hexa-(2-hydroxyethyl)-pentaethylenehexamine,
$N^1,N^6$-di-sec.-decyl-$N^1,N^2,N^3,N^4,N^5,N^6$-hexa-(2-hydroxyethyl)-pentaethylenehexamine and corresponding compounds in which the sec.-alkyl group contains from 11 to about 20 carbon atoms and/or one or both of the groups containing two carbon atoms may be replaced by a group containing 3, 4, 5 or 6 carbon atoms.

As hereinbefore set forth, in a preferred embodiment the alkyl groups attached to the terminal nitrogen atoms are secondary alkyl groups. In another embodiment, these groups may be cycloalkyl groups and particularly cyclohexyl, alkylcyclohexyl, dialkylcyclohexyl, etc., although they may comprise cyclobutyl, cyclopentyl, cycloheptyl, cyclooctyl, etc., and alkyl derivatives thereof. The cycloalkyl groups may be considered as corresponding to secondary alkyl groups. The secondary alkyl configuration is definitely preferred although, when desired, the alkyl groups attached to the terminal nitrogen atoms may be normal alkyl groups but not necessarily with equivalent results.

The borate for use in the present invention is prepared in any suitable manner and generally by reacting the alkanolamine or polyalkylpolyhydroxyalkylalkylenepolyamine with a suitable borylating agent including boric acid, boric anhydride, mono-, di- or trialkylborate, phenyl or cycloalkyl borate, etc., in the presence of a solvent at a temperature of from about 60° to about 100° C. or up to about 200° C. Details of the preparation of the borate are disclosed in the prior art and need not be repeated here.

The exact structure of the borated product will vary with the particular alkanolamine and borylating agent employed, as well as with the proportions of the reactants. For example, when reacting three mol proportions of N,N - dicyclohexyl - ethanolamine with one mole proportion of boric acid, it is believed that the triester is formed, in which all valences of the boron are satisfied by the N,N - dicyclohexyl - aminoethoxy radical formed by the liberation of water. When equal mole proportions of N,N - dicyclohexyl - ethanolamine and boric acid are reacted at a higher temperature, the meta-borate is formed. When employing a trialkyl borate, as the borylating agent, either complete or partial transesterification occurs, depending upon the proportions of reactants and conditions of operation.

Similarly, when the polyalkyl - polyhydroxyalkyl-alkylenepolyamine is a polyalkyl-polyhydroxyalkyl-ethylenediamine, probably compounds may include one or more of the following as monomer or as recuring units: (1)

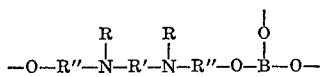

(2) a cyclic configuration in which each of the oxygens of the hydroxy group are attached to a boron atom and the third valence is otherwise satisfied, (3) a polycyclic structure similar to that described in (2) joined by the

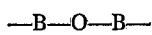

linkage, (4) compound in which each of the hydrogens of the hydroxyl groups are replaced with a

(5) compounds having boroxine configuration and (6) metaborates.

From the above discussion, it will be seen that the exact structure of the borate may vary and also that the product may consist of a mixture of compounds. Accordingly, this component of the synergistic mixture of the present invention is being claimed generically by its method of manufacture. It is understood that the different borated compounds meeting the requirements as hereinbefore set forth may be used for the purposes of the present invention, but that these different compounds are not necessarily equivalent in their effectiveness in the same or different substrate.

The second component of the synergistic mixture of the present invention is the reaction product of a phenol and ketone or aldehyde. While phenol may be used as the reactant in a preferred embodiment an alkyl phenol is used. Nonylphenol is particularly preferred. Other alkyl phenols contain from 1 to about 30 and preferably 3 to 15 carbon atoms in the alkyl group. In still another embodiment a dialkyl phenol is used as a reactant and each alkyl group may contain from 1 to about 30 carbon atoms.

In one embodiment the alkyl phenol is reacted with a ketone. Acetone is particularly preferred. Other ketones include methylethyl ketone, methylpropyl ketone, methylbutyl ketone, methylphently ketone, methylhexyl ketone, etc., diethyl ketone, ethylpropyl ketone, propylbutyl ketone, etc., dipropyl ketone, propylbutyl ketone, etc. In another embodiment the phenol is reacted with an aldehyde including formaldehyde, acetaldehyde, propionaldehyde, butyraldehyde, etc.

The reaction of the phenol and ketone or aldehyde is effected in any suitable manner. In one method, the reaction is effected in the presence of a strong acid such as hydrochloric acid or dry HCl gas. This reaction is well known in the prior art and need not be described in detail herein. For example, the reaction products are described in German Auslegeschrift No. 1,062,926 as well as in various United States patents.

The reaction products generally comprise a mixture of products including alkylidene-bis-(alkylphenols) and hydroxyphenyl chromans. The hydroxyphenyl chromans generally will be either the 2 - (2' - hydroxyphenyl) chromans or the 4 - (2' - hydroxyphenyl) chromans, and will contain whatever alkyl substituents are originally attached to the phenol reactant. As will be illustrated in the following example, a mixture containing about 34% of the alkylidene-bis-phenol and about 23% of the chroman was prepared by this reaction. Illustrative but not limiting examples of alkylidene-bis-alkylphenols which may be included in the reaction products are 2,2'-methylene-bis-(5-isopropylphenol),
2,2'-methylene-bis-(4-methyl-6-isopropylphenol),
2,2'-methylene-bis-(4-methyl-6-tert-butylphenol),
2,2'-methylene-bis-(4-tert-butyl-6-methylphenol),
2,2'-methylene-bis-(4,6-di-tert-butylphenol),
2,2'-methylene-bis-(4-nonylphenol),
2,2'-methylene-bis-(4-decylphenol),
4,4'-methylene-bis-(2,6-di-tert-butylphenol),
4,4'-methylene-bis-(2-methyl-6-tert-butylphenol),
2,2'-ethylidene-bis-(4-methyl-6-tert-butylphenol),
2,2'-ethylidene-bis-(4,6-di-tert-butylphenol),
2,2'-ethylidene-bis-(4-octylphenol),
2,2'-ethylidene-bis-(4-nonylphenol),
2,2'-isopropylidene-bis-(4-methyy-6-isopropylphenol),
2,2'-isopropylidene-bis-(4-isopropylphenol),
2,2'-isopropylidene-bis-(4-isopropyl-6-methylphenol),
2,2'-isopropylidene-bis-(4-methyl-6-tert-butylphenol),
2,2'-isopropylidene-bis-(4-octylphenol),
2,2'-isopropylidene-bis-(4-nonylphenol),
2,2'-isopropylidene-bis-(4-decylphenol),
2,2'-isobutylidene-bis-(4-methyl-6-tert-butylphenol),
2,2'-isobutylidene-bis-(4-nonylphenol), etc. and corresponding 4,4'-alkylidene-bis-(alkylphenols).

Illustrative but not limiting examples of hydroxyphenyl chromans that may be included in the reaction products are 2-(2'-hydroxyphenyl)-2,4,4,5',6-pentamethylchroman,
4-(2'-hydroxyphenyl)-2,2,4,5',6-pentamethylchroman,
2-(2'-hydroxyphenyl)-5',6-diisopropyl-2,4,4-trimethylchroman,
2-(2'-hydroxyphenyl)-5',6-diisopropyl-2,3',4,4,8-pentamethylchroman,
2-(2'-hydroxyphenyl)-5',6-di-tert-butyl-2,4,4-trimethylchroman,
4-(2'-hydroxyphenyl)-5',6-di-tert-butyl-2,2,4-trimethylchroman, 2,(2'-hydroxyphenyl)-5',6-dioctyl-2,4,4-trimethyl-chroman,
2-(2'-hydroxyphenyl)-5',6-dinonyl-2,4,4-trimethyl-chroman,
4-(2'-hydroxyphenyl)-5',6-dinonyl-2,2,4-trimethyl-chroman,
2-(2'-hydroxyphenyl)-5',6-didecyl-2,4,4-trimethyl-chroman, etc.

The borate and reaction product of phenol and ketone or aldehyde will be used in a synergistic amount. This may comprise from about 0.2 to about 0.8 of one component and from about 0.8 to about 0.2 part by weight of the other component. In one embodiment the borate is used in a major proporation and thus may be within the range of from about 0.6 to about 0.8 part by weight of borate and from about 0.4 to about 0.2 part by weight of the phenol and ketone or aldehyde reaction product. When desired, the mixture also may contain one or more other additives which appear to even further increase the effectiveness of the mixture.

In one embodiment the additional additive comprises a hydroxyphenone. Any suitable hydroxyphenone may be employed and may contain one or a plurality of hydroxy groups. Illustrative preferred hydroxybenzophenones include 2-hydroxy - 4 - alkoxybenzophenone, 2-hydroxy-4'-alkoxybenzophenone, 2,2' - dihydroxy-4-alkoxybenzophenone, etc., in which the alkoxy moiety contains from 1 to 12 carbon atoms. Specific illustrative benzophenones include 2-hydroxy-4-methoxybenzophenone,
2-hydroxy-4-octoxybenzophenone,
2-hydroxy-4-dodecyloxybenzophenone,
2-hydroxy-4'-methoxybenzophenone,
2-hydroxy-4'-octoxybenzophenone,
2-hydroxy-4'-dodecyloxybenzophenone,
2,2'-dihydroxy-4-methoxybenzophenone,
2,2'-dihydroxy-4-octoxybenzophenone,
2,2'-dihydroxy-4-dodecyloxybenzophenone,
2,2'-dihydroxy-4,4'-dimethoxybenzophenone,
2,2'-dihydroxy-4,4'-dioctoxybenzophenone,
2,2'-dihydroxy-4,4'-didodecyloxybenzophenone, etc.

In another embodiment the hydroxyphenone includes 2-hydroxy-acetophenone,
2-hydroxy-propiophenone,
2-hydroxy-butyrophenone,
2-hydroxycaprylophenone,
2-hydroxylaurylphenone,
2-hydroxypalmitylphenone, etc.

and these having additional hydroxy and/or alkoxy substituents.

In another embodiment the additional additive is a salicylic acid ester. Illustrative additives include phenylsalicylate, p-alkyl-phenylsalicylates in which the alkyl contains from 1 to 30 carbon atoms including particularly p-t-butyl-phenylsalicylate, p-octyl-phenylsalicylate, etc., as well as the p-alkoxy-phenylsalicylates in which the alkoxy moiety contains from 1 to 10 carbon atoms.

In still another embodiment the additional additive is 1,1,3 - tris - (2 - methyl - 4 - hydroxy - 5-tert-butylphenyl) butane which is available commercially under the trade name of Topanol CA. Other related compounds may be used including, for example, those in which the methyl group is replaced by hydrogen or alkyl of 2 to 6 carbon atoms and/or those in which the tertbutyl is replaced by a tertalkyl group containing from 5 to 10 carbon atoms and/or related compounds in which the butane moiety is replaced by an alkane moiety containing from 5 to 10 carbon atoms.

In still another embodiment the additional additive is dilauryl-thiodipropionate. Other additives in this class include dicapryl - thiodipropionate, dimyristyl - thiodipropionate, dipalmityl-thiodipropionate, distearyl-thiodipropionate, etc.

In still another embodiment the additional additive comprises a trialkylphenol and preferably 2,6-di-tert-butyl-4-methylphenol. Other alkyl phenols include 2,4,6-trialkylphenols in which each alkyl group contains from 1 to 20 carbon atoms and especially where one or two of the alkyl groups contain four or less carbon atoms and the other one or two alkyl groups contains four or more carbon atoms. A number of these trialkyl phenols may be purchased in the open market or, when desired, may be prepared in any suitable manner.

It is understood that one or more of the additional additives may be included in the synergistic mixture of the present invention. The additional additive or additives, when used, will be employed in any suitable concentration and may range from about 1% to about 50% by weight of the final composition.

The synergistic mixture will be used in a stabilizing concentration and may be within the range of from about 0.001% to about 10% and more particularly from about 0.01% to about 2% by weight of the plastic or resin.

As hereinbefore set forth, the synergistic mixture of the present invention is advantageously used as an additive to retard both ultraviolet light and oxidative deterioration, as well as the deterioration due to heat. In one embodiment, this mixture is used in solid organic polymers, including plastics, resins, fibers, etc. Illustrative plastics which are stabilized in accordance with the present invention include polyolefins and particularly polyethylene, polypropylene, polybutylene, mixed ethylene propylene polymers, mixed ethylene butylene polymers, mixed propylene butylene polymers, mixed styrene ethylene polymers, mixed styrene propylene polymers, etc. The solid olefin polymers are used in many applications including electrical insulation, light weight outdoor furniture, awnings, cover for greenhouses, etc.

In another embodiment, the polymers to be stabilized include those prepared from diolefinic monomers as, for example, polybutadiene, or those in which the diolefin or diolefins are reacted with monoolefin or monoolefins, including ABS (acrylonitrile-butadiene-styrene polymers).

Another plastic being used commercially on a large scale which is treated in the present invention is polystyrene. The polystyrenes are particularly useful in the manufacture of molded or machined articles which find application in such goods as windows, optical goods, automobile panels, molded household articles, etc.

Another class of plastics available commercially and which are treated in the present invention is broadly classed as vinyl resin and is derived from monomers such as vinyl acetate, vinylbutyrate, etc. Other vinyl type resins which are stabilized in accordance with the present invention include polyvinylalcohol and copolymers, copolymers of vinyl chloride with acrylonitrile, methylacrylonitrile, alkylacrylates, alkylmethacrylates, alkylmaleates, alkylfumarates, polyvinylbutyral, etc., or mixtures thereof.

Other plastics being used commercially on a large scale which are stabilized according to the present invention are in the textile class and include nylon (polyamide), Perlon L or 6-nylon (polyamide), Dacron (terephthalic acid and ethyleneglycol), Orlon (polyacrylonitrile), Dynel (copolymer of acrylonitrile and vinyl chloride), Acrilan (polyacrylonitrile modified with vinyl acetate), rayon, etc.

Still other plastics which are stabilized by the present invention are prepared from other monomers and are available commercially. Illustrative examples of such other solid polymers include polycarbonates, polyphenyl oxides (polyphenyl ethers), phenol-formaldehyde resins, acryloid plastics which are derived from methyl, ethyl and higher alkyl acrylates and methacrylates as monomers used in the polymerization. Other polymers for stabilization in the present invention include polyacetals, especially polyformaldehydes such as "Delrin" and "Celcon." Still other substrates include vinyl, acrylic cellulose acetate butyrate, ethyl cellulose, etc. Still other substrates for stabilization in the present invention are polyesters, laminate polyesters, etc., polyurethane resins, epoxy resins, various latexes, lacquers, alkyds, varnishes, polishes, stains, pigments, dyes, textile finishing formulations, cosmetics such as creams. lotions, sprays, etc.

It is understood that the plastic or resin may be fabricated into any desired finished product including moldings, castings, fibers, films, sheets, rods, tubing, foams or other shapes.

Another organic substrate which undergoes deterioration due to oxidation and/or weathering is rubber, and the same is stabilized in accordance with the present invention. Rubber is composed of polymers of conjugated 1,3-dienes, either as polymers thereof or as copolymers thereof with other polymerizable compounds, and may be synthetically prepared or of natural origin. Synthetic rubbers include SBR rubber (copolymer of butadiene and styrene), EPR rubber (terpolymer of ethylene, propylene and a diene), Buna A (copolymer of butadiene and acrylonitrile), butyl rubber (copolymer of butadiene and isobutylene), Thiokol rubber (polysulfide), silicone rubber, etc. Natural rubbers include hevea rubber, caoutchouc, balata, gutta percha, etc.

Still other organic substrates which undergo deterioration due to oxidation and/or weathering include paints, varnishes, drying oils, pigments, rust preventative coatings, other protective coatings, etc. These substrates also are stabilized in accordance with the present invention.

The components of the synergistic mixture of the present invention may be added separately to the plastic to be stabilized but preferably the synergistic mixture is first formed by commingling the components, with or without other additives, and then incorporating the mixture in the plastic. When desired, the mixture or the individual components may be utilized as such or prepared as a solution in a suitable solvent. The additives are incorporated in the plastic in any suitable manner, including adding the same to the hot melt, generally in a suitable mixer, extruder or other device.

The following examples are introduced to illustrate further the novelty and utility of the present invention but not with the intention of unduly limiting the same.

Example I

The synergistic mixture of this example comprises approximately 72% by weight of the borate of N,N-dicyclohexyl-ethanolamine and 28% by weight of the reaction product of nonylphenol and acetone. The borate of N,N-dicyclohexyl-ethanolamine was prepared by the reaction of 3 mole proportions of N,N-dicyclohexyl-ethanolamine and one mole proportion of boric acid. In a specific preparation, 68.4 g. (0.3 mole) of N,N-dicyclohexyl-ethanolamine and 6.18 g. (0.1 mole) of boric acid are refluxed in the presence of 100 g. of benzene at a temperature of about 85° C. The heating and refluxing are continued until a total of about 5 cc. of water is collected. Following completion of the reaction, the benzene is removed by vacuum distillation at a temperature of about 170° C. at 0.4 mm./Hg. The borate is recovered as a liquid having a basic nitrogen content of 4.29 meq./g., an acid value of 0.008 meq./g. and a boron content of 1.42 percent by weight. This corresponds to the theoretical boron content of 1.58 percent by weight for the compound tris-(N,N-dicyclohexyl-ethoxy) borate.

The reaction product of alkylphenol and acetone is prepared by the general steps of condensing a technical nonylphenol with acetone by saturating the mixture with anhydrous hydrogen chloride at 60° C. and holding at this temperature for 70 hours. Technical nonylphenol comprises a mixture of alkylphenols containing approximately 18% octyl, 67% nonyl, 13% decyl and small amounts of other alkylphenols in which the alkyl radical contains more than 10 carbon atoms. The alkyl substituents are primarily in the para position and comprise straight and branched chain alkyl groups. Following completion of the reaction the reaction mixture is distilled. The distilled reaction product contains about 34% of 2,2'-isopropylidene-bis-(4-nonylphenol) and about 23% of 2-(2'-hydroxyphenyl)-2,4,4-trimethyl-5',6-dinonylchroman.

Example II

Another synergistic mixture is prepared to comprise 60% by weight of the borate of N,N-di-sec-octyl-ethanolamine and 40% by weight of the reaction product prepared as described in Example I. The borate is prepared by heating and refluxing 33.7 g. (0.0118 mole) of N,N-di-(1-methylheptyl)-ethanolamine and 2.43 g. (0.039 mole) of boric acid in 100 g. of benzene at a temperature of about 85° C. Following completion of the reaction and removal of the benzene by vacuum distillation at 145° C. and 18 mm./Hg, the product is recovered as a liquid having a boron content of 1.30% by weight. This corresponds to the theoretical boron content of 1.25% by weight for the tris-(N,N-di-sec-octyl-ethoxy)-borate.

Example III

The synergistic mixture of this example comprises 75% by weight of the borate of N,N-dicyclohexyl-propanolamine and 25% by weight of the reaction product of dodecylphenol and formaldehyde. The preparation of the borate and the preparation of the reaction product are effected in substantially the same manner as described in Example I.

Example IV

The synergistic mixture of this example comprises 65% by weight of the borate of N,N'-di-sec-octyl-N,N'-di-(2-hydroxyethyl)-ethylenediamine and 35% by weight of the reaction product of octylphenol and acetaldehyde. Here again, the preparation of these additives is accomplished in substantially the same manner as described in Example I.

Example V

As hereinbefore set forth, the synergistic mixture may contain additional additives. The mixture of this example comprises 40% by weight of the borate prepared as described in Example I, 25% by weight of the reaction product of nonylphenol and acetone and 35% by weight of dilaurylthiodipropionate.

Example VI

The synergistic mixture of this example comprises 50% by weight of the borate prepared as described in Example II, 30% by weight of the reaction product prepared as described in Example I and 20% by weight of 2-hydroxy-4'-octoxybenzophenone, the latter being available commercially as Cyanosorb 531.

Example VII

The synergistic mixture of this example comprises 40% by weight of the borate described in Example III, 15% by weight of the reaction product described in Example III, 30% by weight of dilaurylthiodipropionate and 15% by weight of 2,2'-dihydroxy-4-octoxybenzophenone, the latter being available commercially as stabilizer No. 314.

Example VIII

The synergistic mixture of this example comprises 40% by weight of the borate prepared as described in Example I, 20% by weight of the reaction product prepared as described in Example I, 30% by weight of distearylthiodipropionate and 10% by weight of 1,1,3-tris-(2-methyl-4-hydroxy-5-tert-butylphenyl) butane, the latter being available commercially as Topanol CA.

Example IX

As hereinbefore set forth, the synergistic mixture of the present invention is particularly useful as an additive in solid polymers to prevent deterioration due to oxygen and/or U.V. (ultraviolet light) absorption. The present example reports the results of evaluations made in a commercial solid polypropylene which was free of inhibitors.

Samples of the polypropylene, with and without additive, were pressed into sheets, and dumbbell specimens were cut from the sheets. The specimens were thin tensiles of 5–7 mil thickness. As is well known, these thin tensiles are more difficult to stabilize than the thicker tensiles used in other evaluations. The dumbbell specimens were mounted on boards and exposed to carbon arc rays at about 52° C. in a Fade-O-Meter. The specimens were withdrawn periodically, removed from the board and the yield strength determined in an Instron Universal tester. In the Instron Universal tester the specimen is gripped firmly at the top and bottom. A constant pull of 2 inches per minute is exerted downwardly and the point at which the sample loses its resistance to permanent deformation is defined as the yield strength. In most cases, the yield strength is equivalent to the tensile strength which is the pounds per square inch force at which rupture occurs.

A control sample of the polypropylene (not containing the additive) had an initial yield strength of 4480 p.s.i. which dropped to 1260 p.s.i. after 72 hours and was brittle after 96 hours of exposure in the Fade-O-Meter.

Another sample of the polypropylene was prepared to contain 0.35% by weight of the borate prepared as described in Example I. This sample had an initial yield value of 5056 p.s.i. and became brittle after 384 hours of exposure in the Fade-O-Meter. It will be noted that this additive was quite effective when used alone. However, as will be demonstrated below, even further improvement was obtained when used in admixture with the reaction product.

Another sample of polypropylene was prepared to contain 0.35% by weight of the reaction product prepared as described in Example I. This sample had an initial yield value of 4495 p.s.i., which dropped to 3415 p.s.i. after 240 hours and became brittle after 384 hours of exposure in the Fade-O-Meter. Here again it will be noted that the reaction product was quite effective when used alone but, as will be shown below, the combination of the reaction product with the borate gave even improved results.

Another sample of the polypropylene was prepared to contain 0.25% by weight of the borate prepared as described in Example I and 0.10% by weight of the reaction product of nonylphenol and acetone prepared as described in Example I. It will be noted that the total concentration of additive is the same as used in the evaluations made with each component individually as described above. However, the sample containing the mixture of additives had an initial yield value of 4582 p.s.i. but did not become brittle until 480 hours of exposure in the Fade-O-Meter.

From a comparison of the data set forth above, it will be seen that the use of the mixture resulted in a synergistic effect and prevented the sample from becoming brittle for almost 100 hours more than when using the same amount of either component individually. This is surprising because it normally would not be expected that any further improvement would be obtained when using a mixture of such active additives.

Example X

This example reports the results of evaluations made in the Fade-O-Meter using other samples of the solid polypropylene. The dumbbell specimens used in this example were about 20 mils thick.

The sample of the polypropylene was prepared to contain 0.25% by weight of the borate prepared as described in Example I, 0.2% by weight of the reaction produce of nonylphenol and acetone prepared as described in Example I, and 0.1% by weight of dilauryl thiodipropionate. This sample did not become brittle until 960 hours of exposure in the Fade-O-Meter.

Example XI

The mixture of borate, reaction product and dilauryl thiodipropionate also was evaluated as an oxidation inhibitor in another sample of the polypropylene. The evaluation was made in a method similar to that described by Hawkins, Hansen, Matreyek and Winslow in Rubber Chemistry and Technology, October-November, 1959, pages 1164–1170, except that an electrically heated aluminum block rather than an oven was used to maintain the desired temperature. The oxygen absorption of the sample was determined manometrically rather than volumetrically. In this method, samples of the polypropylene, weighing about 0.5 gram each, are placed in separate 8 mm. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to an individual manometer containing mercury, and the differential pressure is periodically determined. The Induction Period is taken as the number of hours required to reach a pressure differential of 20 cm./Hg.

When evaluated in the above manner a control sample of polypropylene without additive has an Induction Period of about 4 hours. In contrast, the sample of polypropylene containing 0.55% by weight of the additive mixture set forth in Example X had an Induction Period of more than 1032 hours. This demonstrates the effectiveness of the mixture of the present invention in retarding oxidative deterioration of the polypropylene.

Example XII

The synergistic mixture of Example II is used as an additive in solid polyethylene of the high density type. An inhibited product of this polyethylene is marketed commercially under the trade name of "Fortiflex." A sample of this polyethylene free of inhibitor is pressed into sheets of about 20 mil thickness and cut into plaques of about 1⅜ inch by 1½ inch. When employed, the additive mixture is incorporated in the polyethylene prior to pressing into sheets. The different samples are evaluated in the Fade-O-Meter. The plaques are inserted into plastic holders, affixed onto a rotating drum and exposed to carbon arc rays at about 50° C. in the Fade-O-Meter. The samples are examined periodically by infrared to determine the carbonyl band at 1715 cm.$^{-1}$, which is reported as the carbonyl number. The higher intensity of the carbonyl band indicates a higher carbonyl concentration (expressed as carbonyl number) and accordingly increased deterioration.

The sample of the polyethylene without inhibitor, when evaluated in the above manner, increases from a carbonyl number of 28 to a carbonyl number of 855 within 624 hours. In contrast, another sample of the polyethylene containing 0.5% by weight of the synergistic mixture of Example II does not develop a carbonyl number of 1000 for a considerably longer period of time.

Example XIII

The synergistic mixture of Example V is utilized in an additive in polystyrene. The synergistic mixture is incorporated in a total concentration of 0.75% by weight by partly melting the polystyrene and adding the additive mixture to the hot melt. The polystyrene containing the synergistic mixture is of improved resistance to deterioration by oxidation and ultraviolet light.

Example XIV

The synergistic mixture of Example VI is utilized as an additive in polyvinyl chloride plastic. Here again, the synergistic mixture is incorporated by partly melting the polyvinyl chloride and adding the synergistic mixture into the hot melt in a concentration of 0.6% by weight. This serves to inhibit deterioration of the polyvinyl chloride plastic due to U.V. light absorption and oxidation.

We claim as our invention:

1. Synergistic antioxidant mixture consisting essentially of (1) from about 0.2 to about 0.8 part by weight of borate of N,N-di-hydrocarbyl-alkanolamine or borate of polyalkyl - or polycycloalkyl - polyhydroxyalkyl-alkylenepolyamine and (2) from about 0.2 to about 0.8 part by weight of algylidene-bis-alkylphenol hydroxyphenyl chroman or mixtures thereof.

2. The synergistic mixture of claim 1 in which the borate is in a proportion of from about 0.6 to about 0.8 part by weight and the reaction product is in a proportion of from about 0.2 to about 0.4 part by weight.

3. The synergistic mixture of claim 1 in which the borate is N,N-dicycloalkyl-alkanolamine borate.

4. The synergistic mixture of claim 3 in which the borate is N,N-dicyclohexyl-ethanolamine borate.

5. The synergistic mixture of claim 1 in which the borate is N,N-di-sec-alkyl-alkanolamine borate containing from 3 to about 20 carbon atoms in said alkyl borate.

6. The synergistic mixture of claim 1 in which the borate is N,N - bis - [N-alkyl-N-(hydroxyalkyl)-aminoalkyl]-alkanolamine.

7. The synergistic antioxidant mixture of claim 1 in which the second component is alkylidene-bis-alkylphenol.

8. The synergistic antioxidant mixture of claim 1 in which the second component 2- or 4-(2'-hydroxyphenyl)-chroman.

9. The synergistic mixture of claim 1 in which the reaction product is a reaction product of nonylphenol and acetone.

10. The synergistic mixture of claim 1 also containing from about 1% to about 50% by weight of dilaurylthiodipropionate.

11. The synergistic mixture of claim 1 also containing from about 1% to about 50% by weight of a hydroxyphenone.

12. The synergistic mixture of claim 1 also containing from about 1% to about 50% by weight of 1,1,3-tris-(2-methyl-4-hydroxy-5-tert-butylphenyl)-butane.

13. Plastic or resin normally subjected to deterioration due to at least one of oxidation, U.V. light absorption and heat containing, as a stabilizer against said deterioration, a stabilizing concentration of the synergistic mixture of claim 1.

14. The plastic or resin of claim 13 containing a stabilizing concentration of the synergistic mixture of claim 4.

15. The plastic or resin of claim 13 containing the synergistic mixture of claim 9.

References Cited
UNITED STATES PATENTS

| | | | |
|---|---|---|---|
| 3,518,193 | 6/1970 | Cyba | 252—400 |
| 3,422,016 | 1/1969 | Cyba | 252—400 |
| 3,026,330 | 3/1962 | Folkers et al. | 252—404 |

RICHARD D. LOVERING, Primary Examiner

I. GLUCK, Assistant Examiner

U.S. Cl. X.R.

252—46.3, 404, 406, 407; 260—45.7 R, 462